US011603284B2

(12) United States Patent
Leigh et al.

(10) Patent No.: US 11,603,284 B2
(45) Date of Patent: Mar. 14, 2023

(54) SYSTEMS AND METHODS FOR DEPLOYING OPTICAL CABLES

(71) Applicant: HEWLETT PACKARD ENTERPRISE DEVELOPMENT LP, Houston, TX (US)

(72) Inventors: Kevin B. Leigh, Cypress, TX (US); John Norton, Houston, TX (US)

(73) Assignee: Hewlett Packard Enterprise Development LP, Spring, TX (US)

(*) Notice: Subject to any disclaimer, the term of this patent is extended or adjusted under 35 U.S.C. 154(b) by 192 days.

(21) Appl. No.: 17/136,233

(22) Filed: Dec. 29, 2020

(65) Prior Publication Data
US 2022/0204309 A1   Jun. 30, 2022

(51) Int. Cl.
  *G02B 6/44* (2006.01)
  *B65H 75/26* (2006.01)
  *B65H 75/24* (2006.01)
  *B65H 54/44* (2006.01)

(52) U.S. Cl.
  CPC .......... *B65H 75/265* (2013.01); *B65H 54/44* (2013.01); *B65H 75/241* (2013.01); *G02B 6/4457* (2013.01); *B65H 2701/32* (2013.01)

(58) Field of Classification Search
  None
  See application file for complete search history.

(56) References Cited

U.S. PATENT DOCUMENTS

| 4,221,347 A | 9/1980 | Hill |
| 5,831,211 A | 11/1998 | Gartung et al. |
| 6,571,047 B1 | 5/2003 | Yarkosky et al. |
| 6,628,886 B2 | 9/2003 | Sommer et al. |
| 9,781,859 B1 | 10/2017 | Wishman et al. |
| 2019/0002101 A1* | 1/2019 | Penet ............ H02G 11/02 |

FOREIGN PATENT DOCUMENTS

| CN | 106936108 B | * 12/2018 | |
| CN | 109335897 A | * 2/2019 | ........... A61B 5/0402 |

OTHER PUBLICATIONS

Cabling.com; "Spool Helps Cable Management _ Cabling Installation & Maintenance"; Jul. 14, 2011; 1 pages.

\* cited by examiner

*Primary Examiner* — Chad H Smith
(74) *Attorney, Agent, or Firm* — Nolte Intellectual Property Law Group

(57) ABSTRACT

A system that may be used for deploying optical cables, the system may include a track having an outer edge and a surface, the track having a track gear disposed proximate the outer edge and a plurality of track grooves disposed on the surface of the track. The system may also include a spool having a first outer edge and a second outer edge. The spool may include a first wheel disposed on the first outer edge, a second wheel disposed on the second outer edge, a spool gear disposed on the first wheel and interfacing with the track gear, plurality of spool grooves, and a plurality of guides interfacing with the track to align the track grooves with the spool grooves.

20 Claims, 18 Drawing Sheets

SYSTEMS AND METHODS FOR DEPLOYING OPTICAL CABLES

BACKGROUND

Optical cables are used in computing and datacenters to connect various computing components including, for example and without limitation, servers, routers, switches, and the like. Optical cables may be deployed individually and manually in overhead cable trays or under raised floors by laying down the cables and organizing them using mechanical attachments, such as tie-wraps. The deployed cables may thereafter be used to provide optical communication between the various computing components.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
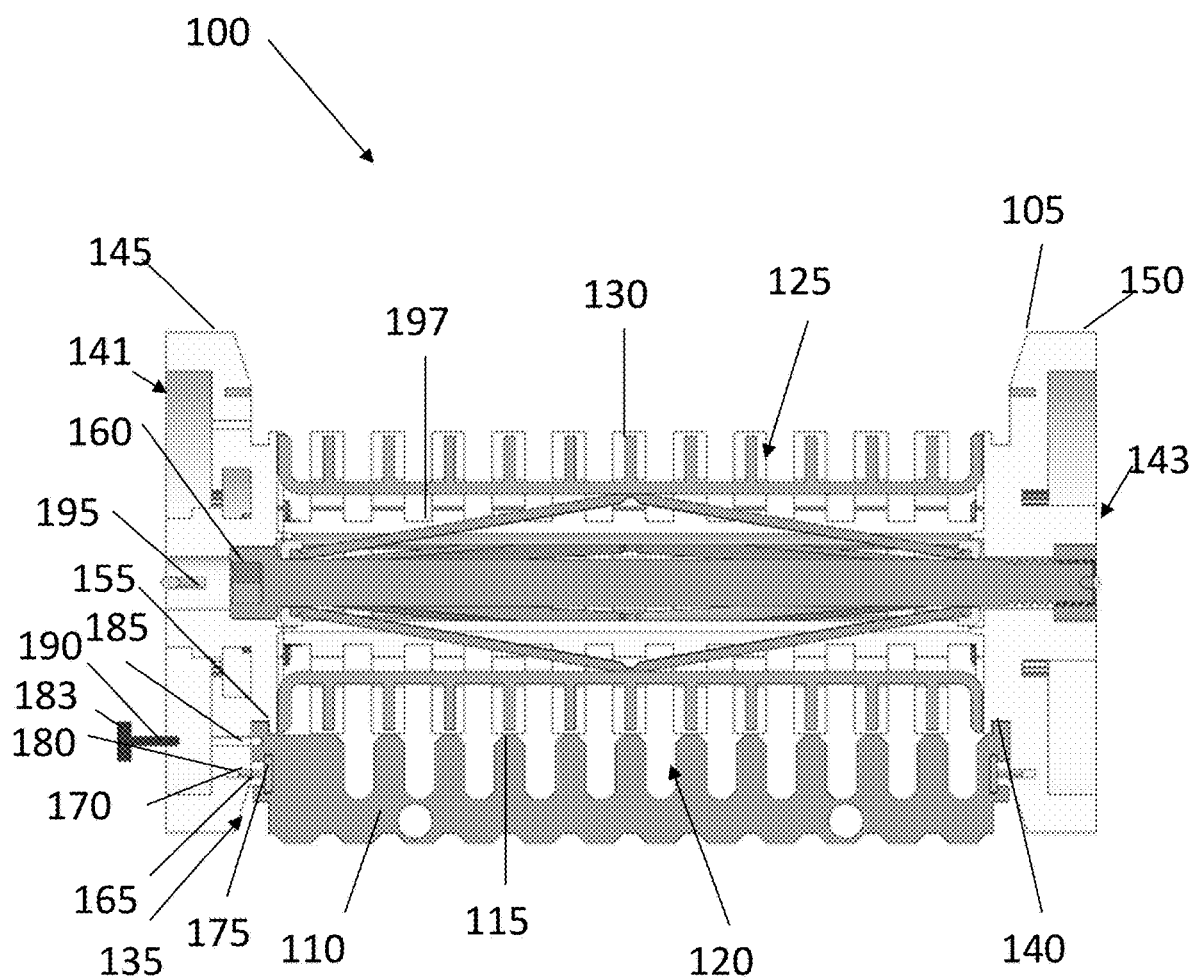
FIG. 1 is a side cross-sectional view of a system for deploying optical cables, according to one or more examples of the present disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

Aspects of the present disclosure may include systems and methods for deploying optical cable within computing environments. Optical cables may include an optical fiber, multiple optical fibers, multiple optical fibers with strength members, and the like. In certain aspects, an optical fiber may have a protection jacket, no protection jackets, i.e., constitute fiber strands, or may be minimally jacketed. An optical fiber may also include one or multiple fiber cores and may be single-mode or multi-mode type fibers. In certain implementations, such systems may include spools to receive cable. Such a spool may then be disposed on a track within the computing environment so that as the spool is moved relative to the track, cable is released from the spool into or onto the track. The cable may then be used to connect various computing devices, such as computers, servers, routers, switches, and the like.

In certain implementations, such systems may include automation mechanisms that may allow for the substantially automated deployment of optical cables. Such automated systems may include motorized components disposed relative to the spools, which may allow the spool to be remotely controlled during optical cable deployment. In such aspects, remote control may be possible through system controllers that are attached to or located proximate the spool and/or track, thereby allowing an operator to operate the system from a remote location. Additionally, such aspects may allow for monitoring and tracking mechanisms that allow the system controller or other computing elements connected to the system to monitor cable deployment.

Aspects of the present disclosure may further provide the ability to deploy optical cables in difficult to reach locations, such as in hard to access locations, for example in elevated cable ways, under raised floors, and the like. At the same time, such aspects may allow for cable installation to proceed more quickly, which may decrease operational costs of deploying the cable. Moreover, such systems and methods may be used to connect different types of devices using different types of cables. For example, if a connection is being updated or otherwise converted to a different type of cable or connection, changing the cabling may be more efficient, thereby allowing systems to adapt to changing network topologies. Specific aspects of the present disclosure are explained below in detail with respect to the referenced figures.

Figure 2:
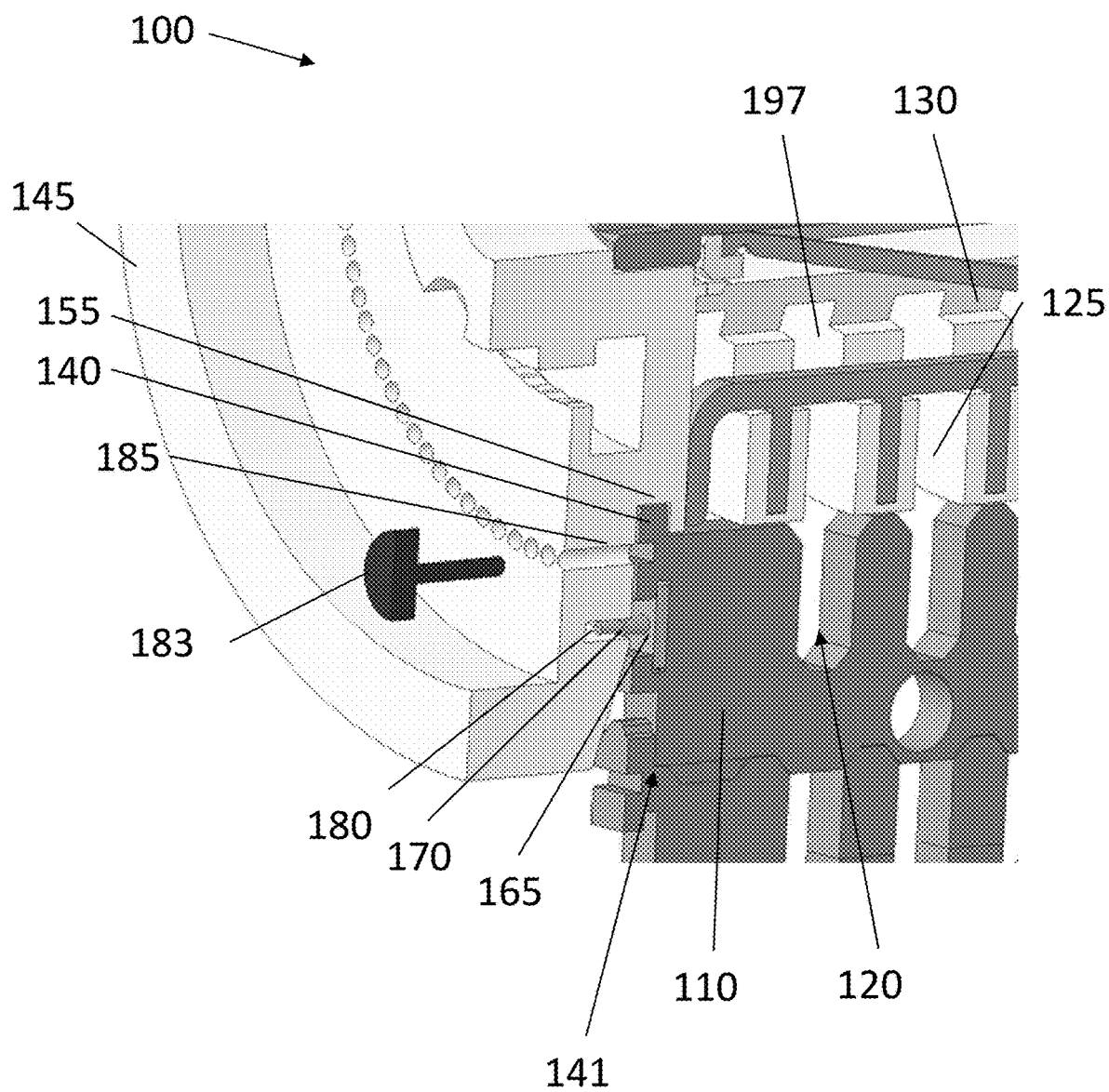
FIG. 2 is a close perspective partial cross-sectional view of a system for deploying optical cables, according to one or more examples of the disclosure.

Turning to FIGS. 1 and 2 together, a side cross-sectional view and a close, perspective, partial cross-sectional view of a system for deploying optical cables according to the present disclosure are shown. In this implementation, the system 100 includes a spool 105 disposed on a track 110. Track 110 includes a surface 115 that is configured to engage spool 105. Track 110 includes a plurality of track groves 120 that are disposed on the surface 115. Track grooves 120 may have varying geometries such as, for example, rectangular, radiused, irregular, and the like. In the present illustration, track grooves 120 are shown having an irregular geometry that includes a general U-shape.

Spool 105 includes a plurality of spool grooves 125 onto which optical cable may be wound or otherwise disposed prior to deployment. Spool grooves 125 are dimensioned so that an optical cable may be disposed with an individual spool groove 125. Thus, the dimensions of the grooves will be implementation specific depending upon the diameter of the optical cable to be laid. Spool grooves 125 may also have varying geometries, such as rectangular, radiused, or irregular. In the present illustration, spool grooves 125 are shown having a generally rectangular geometry.

The size and number of spool grooves 125 may be varied, i.e., they may be orientated to accept individual cables, multiple narrow and/or wide harness cables, each having multiple cable segments, etc. In the illustrated example, the spool 105 includes ten spool grooves 125, thereby permitting ten optical fibers of an optical cable to be laid at the same time. Each spool groove 125 may hold one, two, or more fibers for an optical cable as determined by specific operations, thereby allowing multiple computing elements to be connected. As noted, this may differ in alternative examples.

Spool also includes a plurality of guides 130. Guides 130 interface with track 110 to align track grooves 120 with spool grooves 125. Accordingly, during operation, optical cable may be deployed from spool grooves 125 into track grooves 120. Guides 130 may include raised portions that extend from the surface 115. The height that guides 130 extend above the surface 115 may vary based on the size of optical cable being deployed, as well as the operational requirements within a specific computing environment.

Track 110 may further have an outer edge 135, and in certain aspects, two outer edges 135 may be used to interface track 110 with spool 105. A track gear 140 may be located on or proximate outer edge 135. In the illustrated example, the track gear 140 is shown located on the outer edge 135. As used herein, "proximate" means located on the track 110, or on a track assembly 141 within a distance of track 110 so that the optical cable (not shown) may effectively be transferred from the spool grooves 125 into the track grooves 120. Track gear 140 may include a plurality of teeth (not separately shown). The plurality of teeth will be illustrated in greater detail below.

Spool 105 may include a first wheel 145 disposed on a first outer edge 141 and a second wheel 150 disposed on a second outer edge 143. In certain aspects, spool 105 may also include a spool gear 155 that is disposed or formed on at least one of first wheel 145 and second wheel 150. Spool gear 155 may interface through physical contact with track gear 140, thereby allowing spool 105 to roll or otherwise moved over the surface 115 of track 110. In certain implementations, spool gear 155 may include a plurality of teeth (not separately shown), which may engage the teeth of track gear 140. In other implementations, spool gear 155 and/or track gear 140 may be substantially smooth or otherwise not include teeth that require engagement. In such implementations, spool gear 155 and/or track gear 140 may include a surface that is augmented to provide a desired amount of friction therebetween, thereby allowing spool gear 155 to roll or other wise move relative to track 110.

Spool 105 may also include adjustable spool 160. Adjustable spool 160 may be used to change a diameter of spool grooves 125, thereby allowing spool 105 to be adaptable to optical cables of varying length and/or diameter. The adjustability of adjustable spool 160 will be discussed in greater detail with respect to additional figures provided below.

One or more tracking wheels 165 may be disposed on track 110 and extend radially outward into spool 105. In certain aspects, tracking wheels 165 may include a radially extending engagement plunger 170, which may include a flared collar 175 that is placed within a track recess 180. The engagement between tracking wheels 165, track 110, and spool 105 may thereby allow spool to be installed and/or removed from track. Tracking wheels 165 may further keep spool 105 on track 110 regardless of orientation, thereby allowing spool 105 to move along track 110 in horizontal, vertical, or angled orientations. Such versatility may thereby allow optical cables to be deployed in various computing environments.

In certain implementations, a locking pin 183 may be used to prevent spool 105 from moving relative to track 110. Locking pin 183 may be inserted through spool 105 into a lock pin hole 185 located on track 110. Locking pin 183 may thereby be used prior to optical cable deployment or at the end of the unspooling of optical cables to temporarily hold spool 105 in place relative to track 110. Locking pin 183 may be formed to include various geometries such as, for example, a radially extending protrusion 190 that is insertable into lock pin hole 185. In other implementations, locking pin 183 may have various geometries, such as generally circular, rectangular, and the like. While in this aspect, locking pin 183 is shown engaged on one side of spool 105, in other aspects, more than one locking pin 183 may be used to lock spool 105 to track 110 from more than one location.

System 100 may further include a handle 195 that is disposed on or otherwise attached to spool 105. Handle 195 may be used to manually move spool 105 along track 110 during deployment of optical cables. Spool 105 may be releasably connected to track 110, thereby allowing wheels 145/150 to rotate relative to handle 195. Handle 195 will be illustrated in greater detail in additional figures provided below.

Spool groves 125 may also include a recess 197. Recess 197 may thereby allow an optical connector (not shown) located at the end of an optical cable to be connected to spool 105. The optical connector, when disposed in recess 197 may hold the optical cable in place during installation of the optical cable onto spool 105, as well as during deployment of the optical connector within a computing environment. Additional aspects of the present disclosure will be described in detail below.

Figure 3:
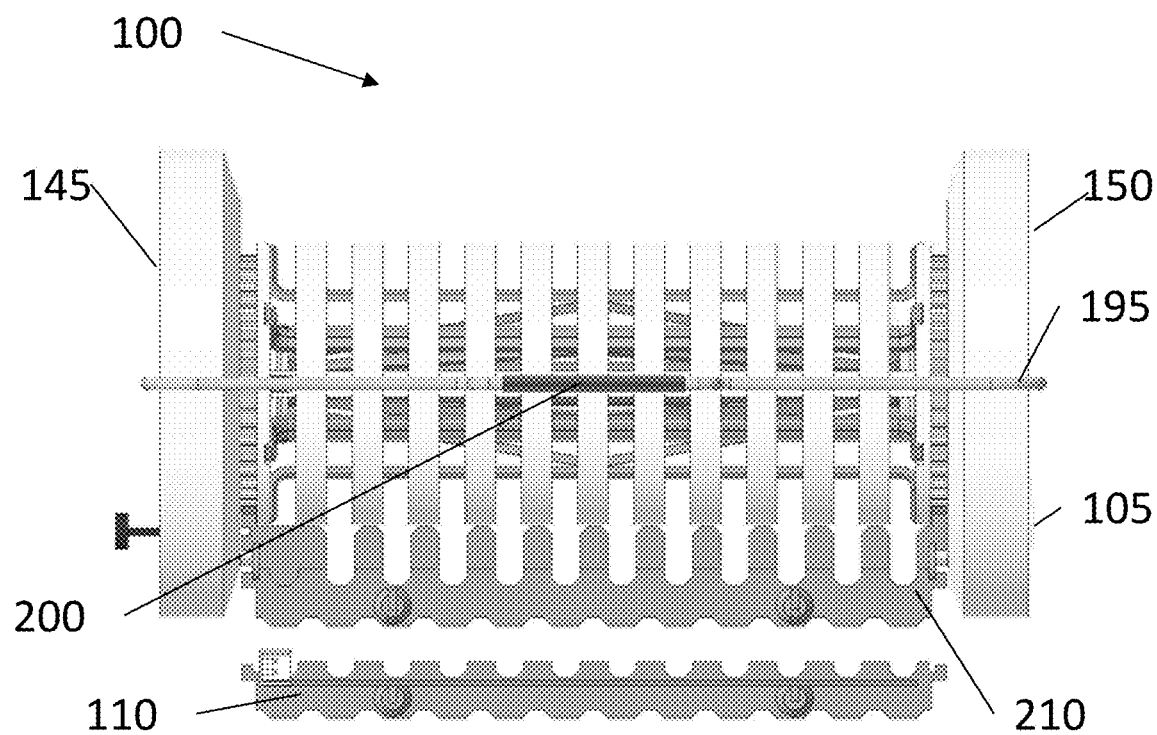
FIG. 3 is a side view of system, according to one or more examples of the disclosure.
Figure 4:
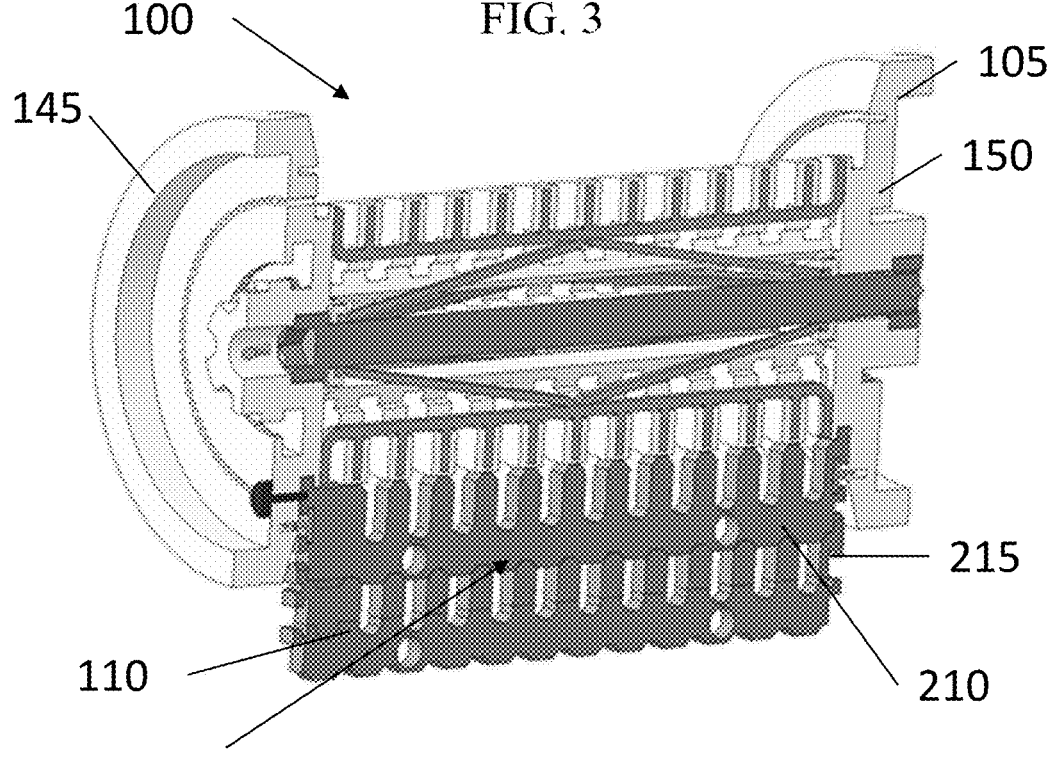
FIG. 4 is a cross-sectional view of system, according to one or more examples of the disclosure.

Turning to FIGS. 3 and 4 together, a side view, and a cross-sectional view of system 100 according to the present disclosure are shown. In this aspect, handle 195 is illustrated extending from spool 105. Handle 195 may have one or more flanges 200, thereby allowing an operator to roll or otherwise move spool 105 relative to track 110. While handle 195 is illustrated as expending over track 110, in other implementations, handle 195 may extend radially from one or more of wheels 145/150, thereby allowing an operator to move spool 105 relative to track 110 from the side of system 100.

Additionally, in this aspect, a modular track system 205 is shown, in which track 110 is connected or otherwise engaged with a second track 210. The engagement between track 110 and second track 210 may be direct, as is illustrated in FIG. 3 or may include use of a spacer 215. As used herein, the term "direct" means that the engagement includes physical contact without the use of a spacer or other, similar, structure. Spacer 215 may be used to increase the size of track grooves 120, thereby allowing optical cables of varying length and diameter to be deployed. In certain implementations more than one spacer 215 may be used to further increase the size of track grooves.

Second track 210 and/or spacers 215 may be modularly connected to track 110, second track 210, or additional tracks (not shown). Accordingly, a number of tracks 110, second tracks 210, and the like may be stacked on top of one another allowing for multiple optical cable runs to be installed relative to one another. For example, optical cables may be installed on track 110 using spool 150 first, before attaching track 210 to track 110. In certain implementations, second track 210, spacer 215, etc., may be attached to track 110 using various mechanical attachments, such as bolts, clips, screws, rivets, and the like. As such, during deployment, system 100 may be used to deploy cable in various orientations, as track 110, second track 210, and/or spacer 215 may be either temporarily or permanently locked into place relative to each other.

Figure 5:
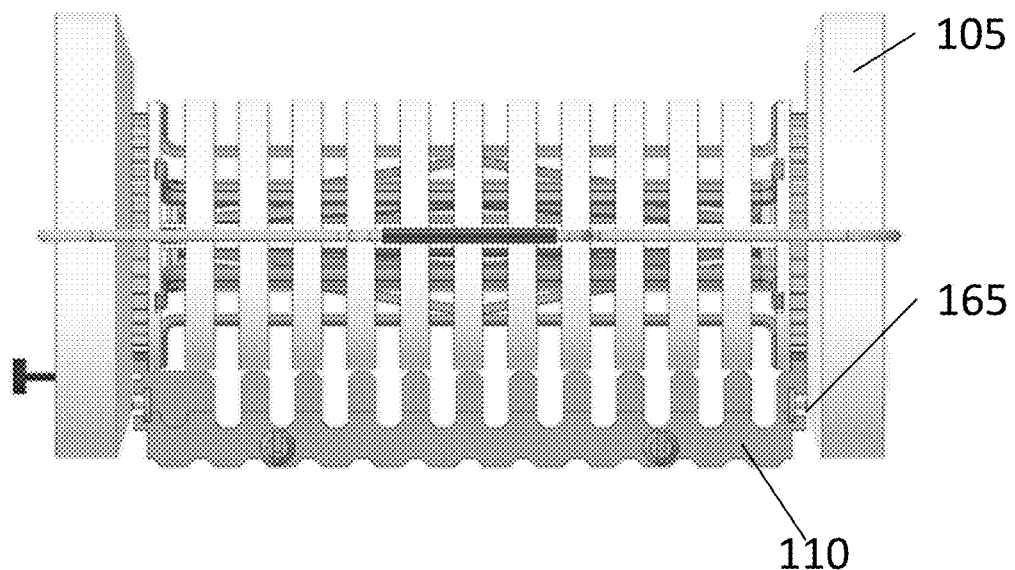
FIG. 5 is a cross-sectional view of installation orientations using system for deploying optical cables, according to one or more examples of the present disclosure.
Figure 6:
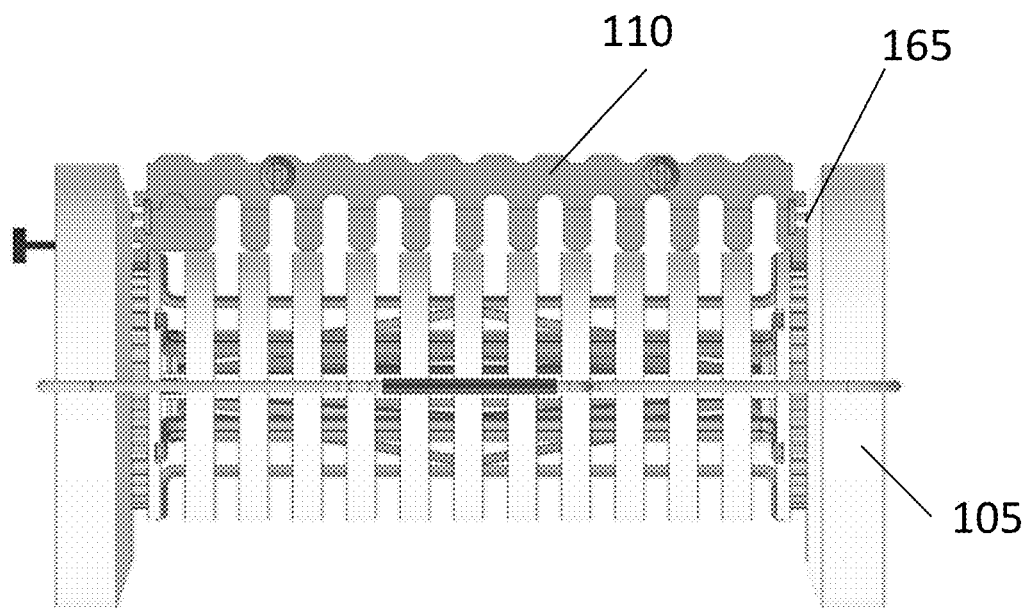
FIG. 6 is a cross-sectional view of installation orientations using system for deploying optical cables, according to one or more examples of the disclosure.
Figure 7:
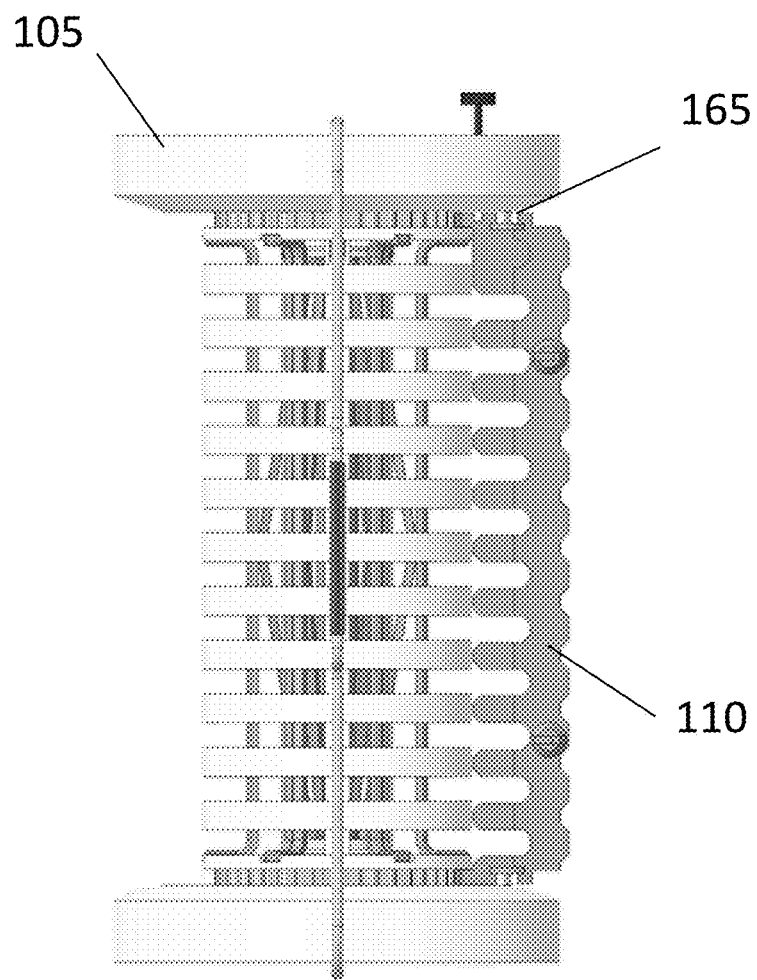
FIG. 7 is a cross-sectional view of installation orientations using system for deploying optical cables, according to one or more examples of the present disclosure.

Turning to FIGS. 5, 6, and 7, various installation orientations using a system for deploying optical cables according to the present disclosure are shown. Referring first to FIG. 5, a bottom side orientation for deployment of optical cables is shown, wherein an optical cable is deployed below spool 105 and onto track 110. As illustrated, optical cable may be deposited from spool 105 disposed on top of track 110. As such, the optical cable may be deposited into place as spool 105 is rolled over the top of track 110.

Referring specifically to FIG. 6, a top side orientation for deployment of optical cables is shown. In this orientation, track 110 is located above spool 105. Optical cable may thus be deposited into track 110 as spool is moved under track 110. In such an orientation, certain mechanical devices (not shown) may be used to hold optical cables within track. Examples of mechanical devices to hold an optical cable within a track are illustrated and described in detail below.

Referring specifically to FIG. 7, a side facing orientation is shown. Using such an orientation, optical cable may be deployed on a side mounted track 110. In still other aspects, a sideways facing orientation may refer to an angular orientation of track 110, such that optical cable may be deployed at any number of angular orientations, such as, for example 5 degrees, 15 degrees, 30 degrees, 45 degrees, 90 degrees, and various ranges therebetween, both lesser than 5 degrees and/or greater than 90 degrees. The angular orientation of spool 105 and track 110 may be relative with respect to a latitudinal or longitudinal axis that runs through the center or spool 105 and/or track 110.

Regardless of the orientation, spool 105 may be engaged with track 110 using one or more tracking wheels 165. Because tracking wheels 165 removably secure spool 105 to track 110, the orientation in which optical cables may be deployed may be changed, thereby allowing for modularity in deployment of system 100.

Figure 8:
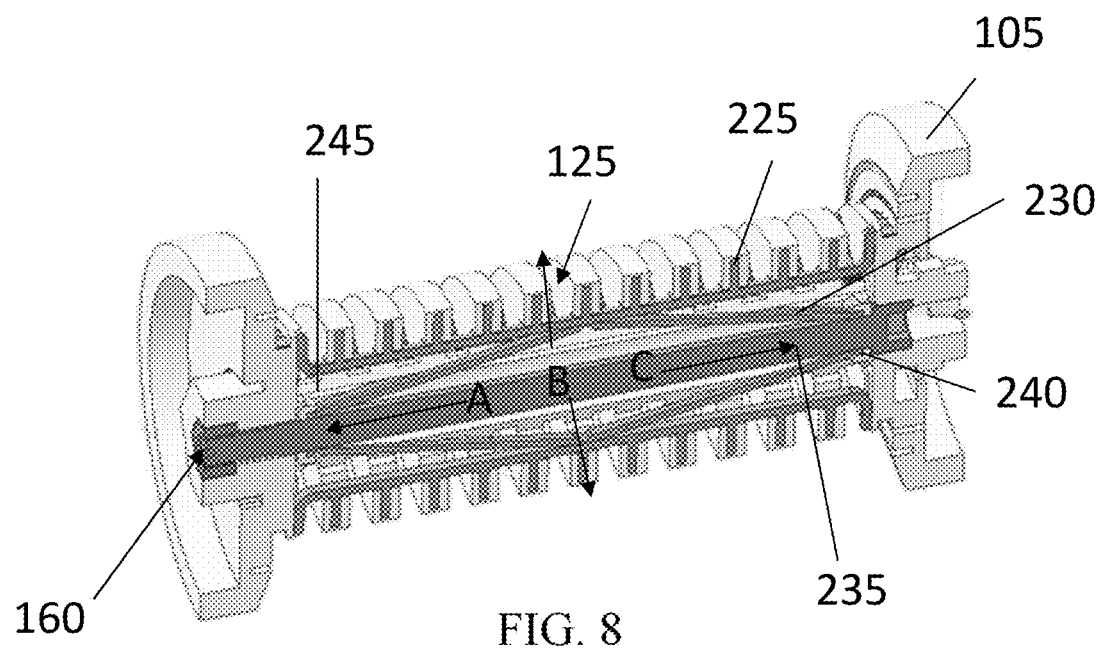
FIG. 8 is a cross-sectional view of a spool, according to one or more examples of the present disclosure.
Figure 9:
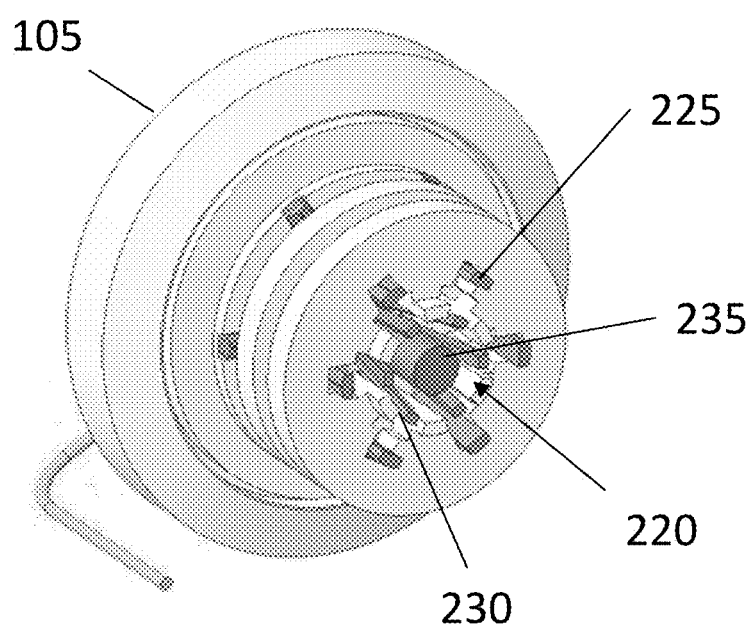
FIG. 9 is a close perspective cross-sectional view of a spool, according to one or more examples of the present disclosure.

Turning to FIGS. 8 and 9, a cross-sectional view of a spool and a close perspective cross-sectional view of a spool according to the present disclosure is shown. As briefly discussed above, the size of spool grooves 125 may be adjusted, thereby allowing optical cables of different diameter, lengths, and sizes to be deployed using spool 105. In this implementation, spool 105 has a plurality of sleeve segment grooves into which a corresponding plurality of sleeve segments 225 are disposed. Spool also includes a plurality of sleeve segment springs 230 that are disposed around an adjustable spool 160.

Adjustable spool 160 includes a rod screw 235 that may be used to compress or retract sleeve segment springs 230, which in turn may radially push out or pull in sleeve segments 225 about the spool axis. The compression and retraction of sleeve segment springs 230 may thereby move the sleeve segments 225 to adjust the size, e.g., a depth, of spool grooves 125. Accordingly, as rod screw 235 is moved in direction A, sleeve segment springs 230 are expanded in direction B. Such compression pushes sleeve segments 225 radially outward thereby decreasing the depth of spool grooves 125. Decreased depth of spool grooves 125 allows smaller diameter and/or shorter optical cables to be spooled within each spool groove 125. Similarly, as rod screw 235 is moved in direction C, sleeve segment springs 230 are retracted, thereby moving sleeve segments 230 radially inward, thereby increasing the depth of spool grooves 125. Increased depth of spool grooves 125 allows larger diameter and/or longer optical cables to be spooled within each spool groove 125. Adjusting the depth of spool grooves 125 for specific optical cables size and length allows optical cables to be dropped into track grooves 120 when optical cables are deployed.

To move rod screw 235, rod screw 235 may be turned. By turning rod screw 235, rod screw 235 may be forced within an inner portion of spool causing one or more shoulders 240 to press against sleeve segment springs 230. Sleeve segments springs 230 are forced radially outward as they are held in place longitudinally by a second shoulder 245 located on an opposite end of spool 105 from shoulders 240. An example of modifying spool grooves 125 is illustrated with respect to FIGS. 10, 11, and 12.

Figure 10:
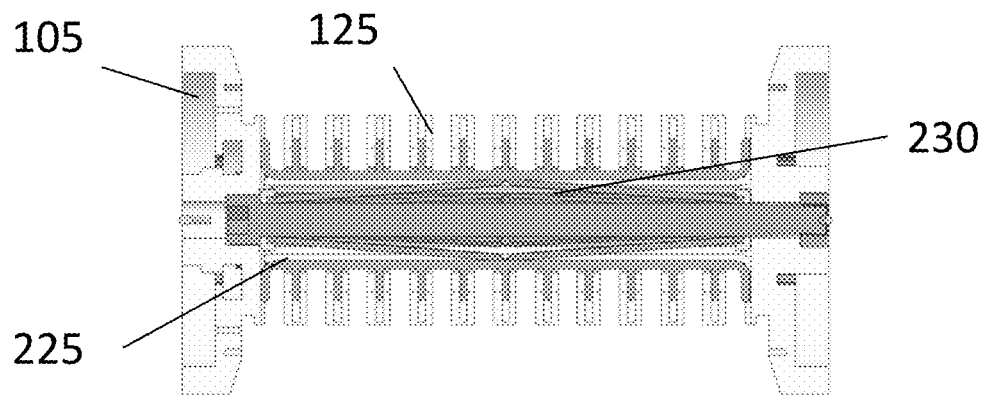
FIG. 10 is a cross-sectional view of a spool in a retracted position a cross-sectional view of a spool in a retracted position, according to one or more examples of the present disclosure.
Figure 11:
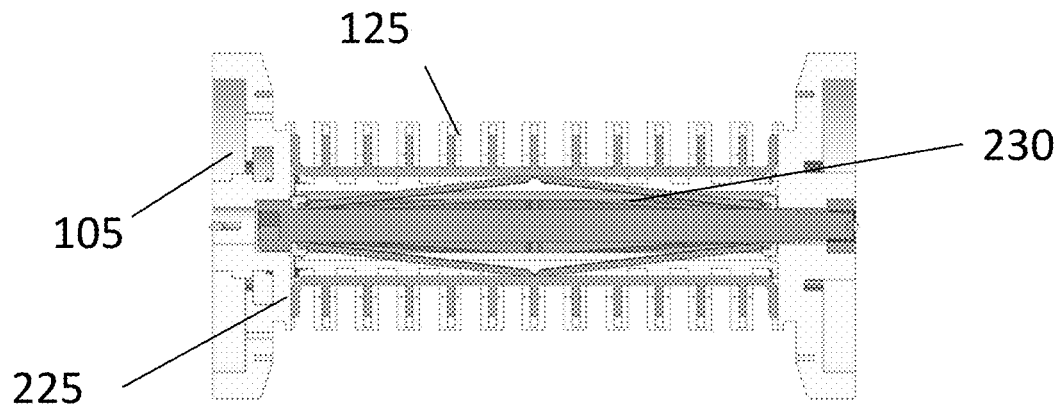
FIG. 11 is a cross-sectional view of a spool in an intermediary position, according to one or more examples of the present disclosure.
Figure 12:
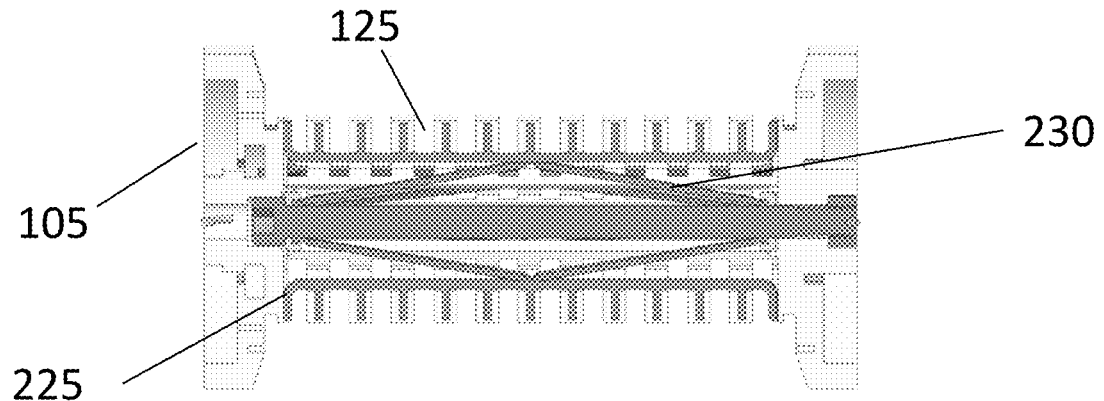
FIG. 12 is a cross-sectional view of a spool in an intermediary position, according to one or more examples of the present disclosure.

Still referring to FIGS. 10, 11, and 12, a cross-sectional view of a spool in a retracted position, and intermediary position, and an expanded position according to the present disclosure is shown. Referring specifically to FIG. 10, sleeve segment springs 230 are illustrated in a retracted position, thus increasing the relative depth of spool grooves 125. FIG. 11 shows spool 105 in an intermediary position, where sleeve segment springs 230 are partially expanded, thereby forcing sleeve springs 230 radially outward, which causes sleeve segments 225 to be forced longitudinally apart, decreasing the depth of spool grooves 125. FIG. 12 shows spool 105 in an expanded position, where sleeve segment springs 230 are fully expanded, thereby forcing sleeve springs further radially outward, thereby causing sleeve segments 225 to be forced further longitudinally apart. In the expanded position, the depth of spool grooves 125 may be relatively smaller compared to the retracted and intermediary positions of the sleeve segment springs 230.

Figure 13:
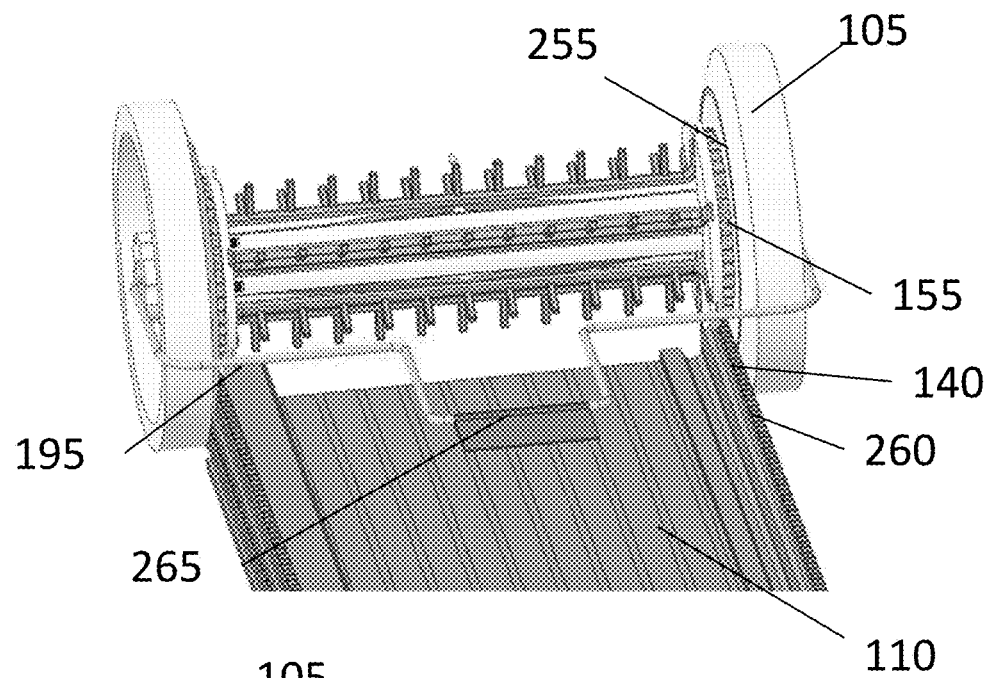
FIG. 13 is an elevated perspective view of a spool engaging a track, according to one or more examples of the present disclosure.

Turning to FIG. 13, an elevated perspective view of a spool engaging a track according to the present disclosure are shown. In this aspect spool 105 is disposed on track 110 such that spool gear 155 engages track gear 140. In this implementation, spool gear 155 includes a plurality of spool gear teeth 255 that correspond to a plurality of track gear teeth 260. Through engagement of spool gear teeth 255 and track gear teeth 260, spool 105 may be rolled or otherwise moved along track 110. Additionally, the engagement of spool gear teeth 255 with track gear teeth 260 may cause spool 105 to be held in place with respect to track 110, thereby allowing for a change in orientation between spool 105 and track 110 while providing mechanical stability between spool 105 and track 110.

Handle 195 is also illustrated as being attached to spool 105, thereby allowing an operator to move spool 105 over track 110. In this aspect, handle 195 has an extended portion 265 that may allow an operator to easily pull spool 105. However, in other aspects, extended portion 265 may not be present, and an operator may use another portion of handle 195 to pull spool 105 over track 110.

Turning now to FIGS. 14, 15, 16, 17, and 18, a perspective view of an unassembled track, a perspective view of a spool on an assembled track, a close perspective view of partial track sections, a second close perspective view of partial track sections, and a perspective view of a cable egress section according to the present disclosure are shown. In this aspect, a spool 105 is illustrated in engagement with a track 110. Track 110 may be placed on top of a second track 210 and may be held in place using one or more track engagement devices 270 (shown in FIG. 18).

Track 110 and/or second track 210 may include one or more track sections 275. Track sections 275 may be connected and/or disconnected to increase or decrease the length of track 110 and/or 210, respectively. To connect track sections 275, protrusions 280 may extend from an end of a specific track section 275 and engage or otherwise connect with a corresponding track notch 285. In certain aspects the engagement between protrusions 280 and corresponding notches 285 may lock track sections 275 into place. In other aspects, protrusions 280 and corresponding notches 285 may simply hold track sections 275 into place, thereby preventing track sections 275 to move during optical cable deployment.

As illustrated, track 110 and second track 210 are illustrated having three track sections, however, in other aspects, track 110 and/or second track 210 may have more or less than three track sections 275. Additionally, track 110 and second track 210 may have a different number of track sections 275, thereby increasing the modularity of system 100.

Figure 18:
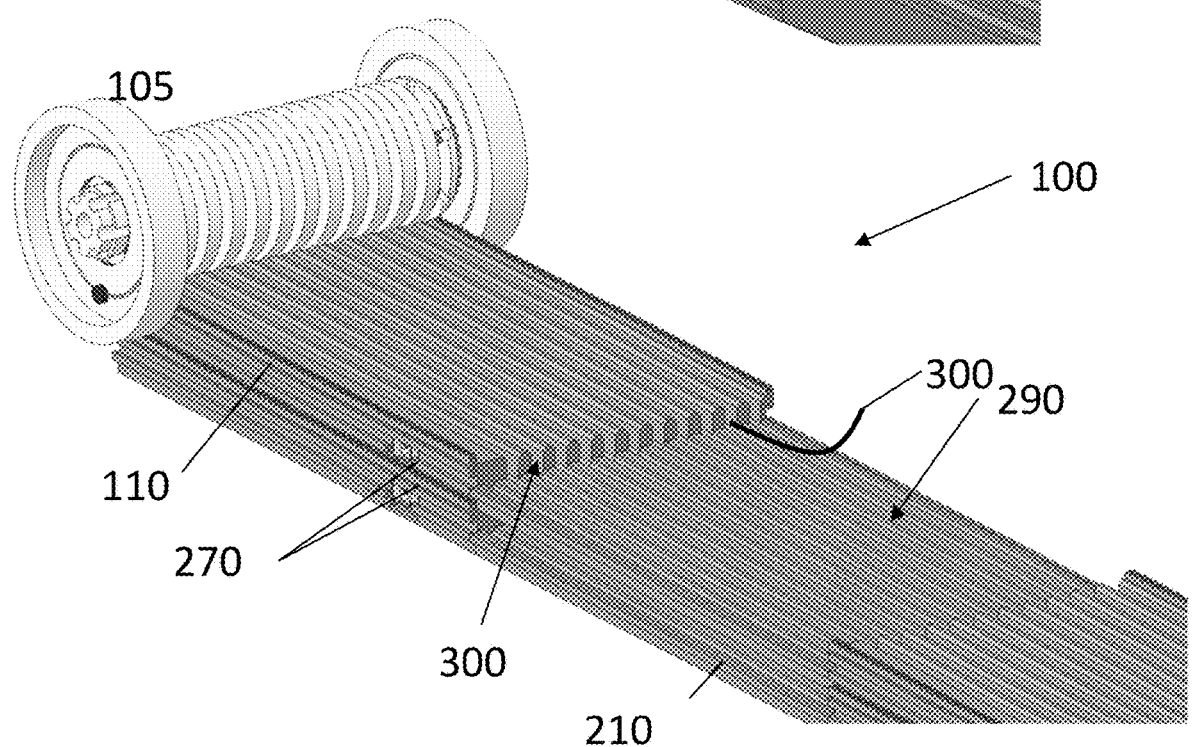
FIG. 18 is a perspective view of a cable egress section, according to one or more examples of the present disclosure.

In certain implementations, system 100 may include a cable egress section 290 (shown in FIG. 18). Cable egress section 290 may be a portion of track 110 or track 210 that includes a missing track section 275, thereby allowing one or more optical cables 300 to exit track 110 or 210. As track sections 275 may be modularly installed and/or removed, cable egress section 290 may be present at certain locations and may be removed at other locations, depending on the requirements of the deployment.

Figure 19:
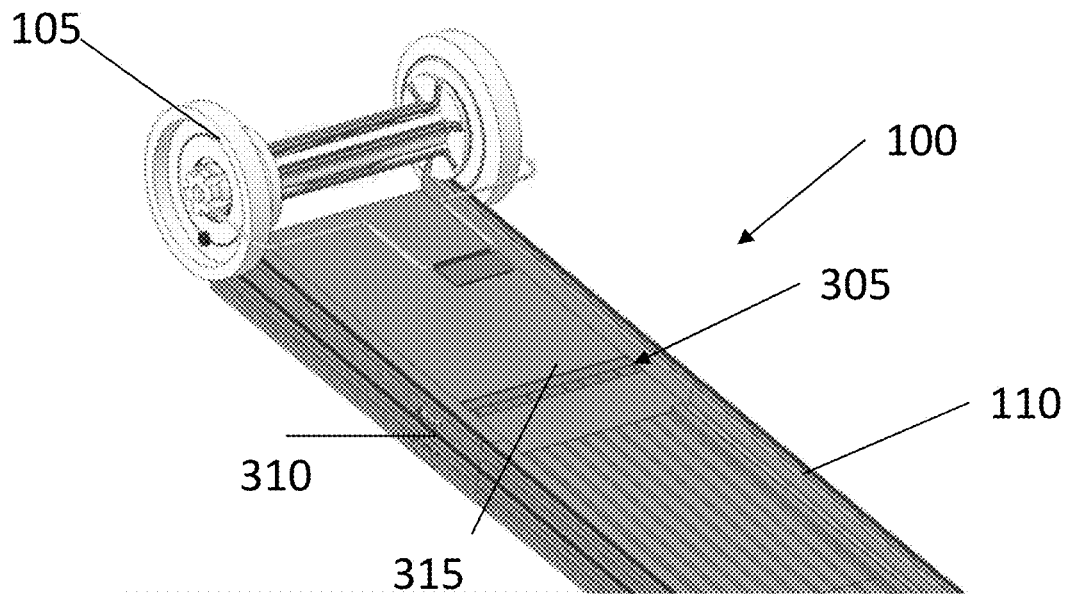
FIG. 19 is a perspective view of a system for deploying optical cable, according to one or more examples of the present disclosure.
Figure 20:
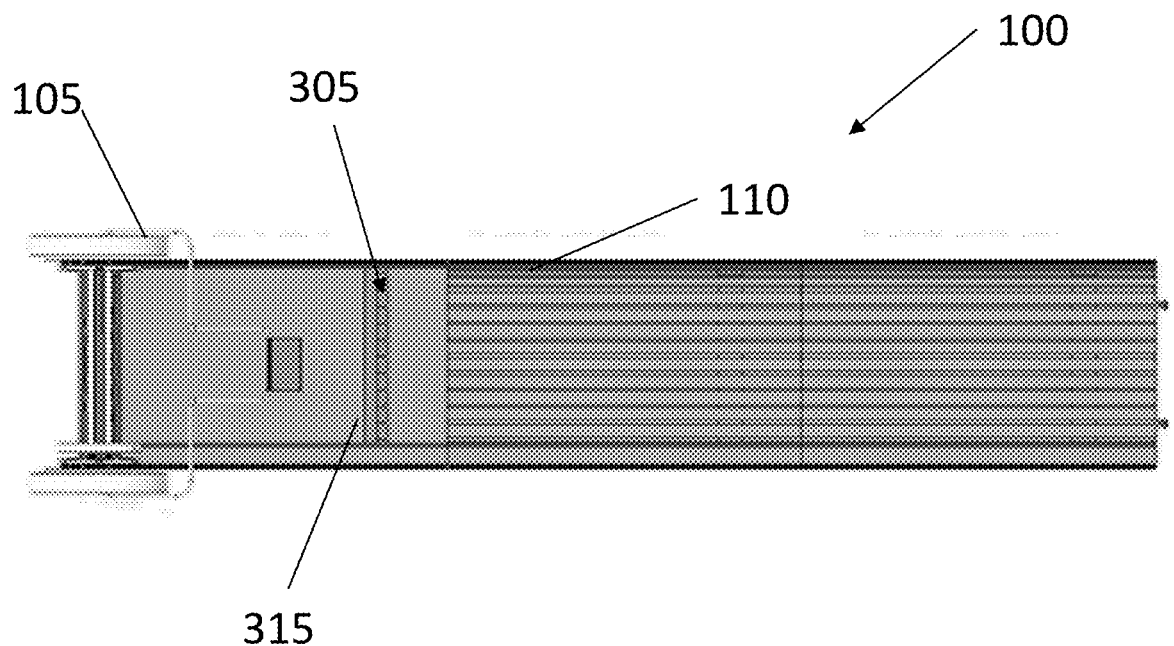
FIG. 20 is a top view of a system for deploying cable, according to one or more examples of the present disclosure.

Turning to FIGS. 19 and 20, a perspective view of a system for deploying optical cable and a top view of a system for deploying cable according to the present disclosure are shown. In this implementation, system 100 includes a spool 105 disposed on a track 110. Track 110 may include a tag reader 305, which may include one or more sensors, to collect information from radio frequency tags, QR code tags, and the like, to determine certain parameters about the optical cable deployed within each track. For example, the tag reader 305 may be used to determine manufacturing information, fiber count, fiber type, fiber length, and the like, of an optical cable. Tag reader 305 may include a tag reader interface connector 310 and/or a tag reader antennae 315, thereby allowing information to be collected from system 100, and allow external devices to be connected to tag reader 305. For example, external monitoring equipment and/or computing devices may be connected to tag reader interface connector 310, thereby allowing information about system 100 to be collected therefrom during or after optical cable deployment.

Tag reader 305 may be slidably engaged into track 110 and may be exposed fully or partially exposed within track 110. In certain implementations, tag reader 305 may not be visible from the top of track 110, while in other implementations, the type of information collected from system 100 may result in tag reader 305 being visible.

Figure 21:
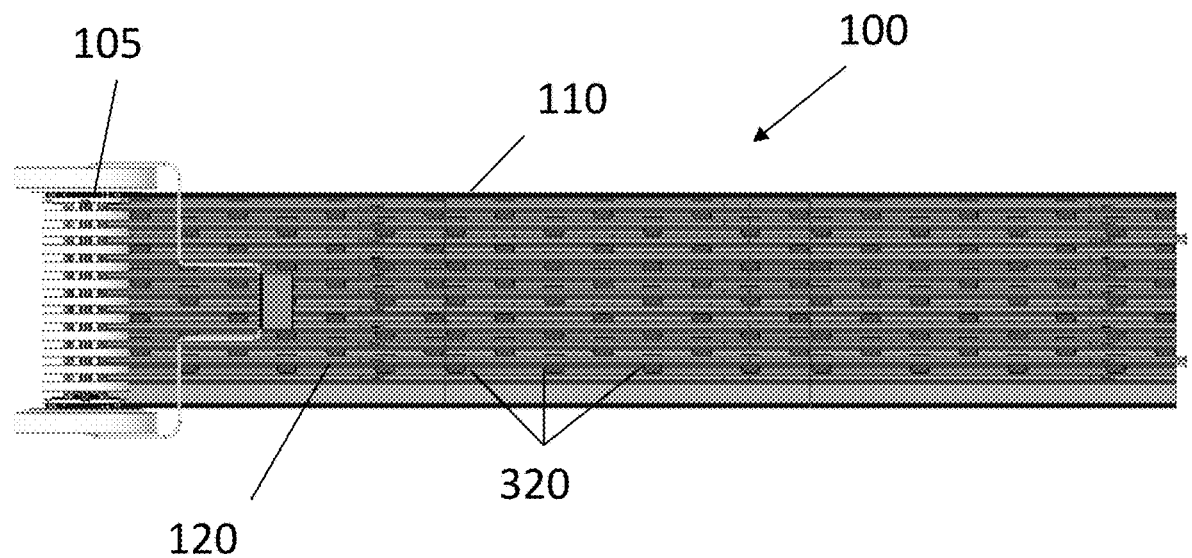
FIG. 21 is a top view of a system for deploying optical cables, according to one or more examples of the present disclosure.

Turning to FIG. 21, a top view of a system for deploying optical cables according to the present disclosure is shown. In this implementation, system 100 includes a spool 105 and a track 110. In order to hold optical cables in place during and after deployment, one or more cable retention tabs 320 may be attached to track grooves 120. Cable retention tabs 320 may be disposed on a side of track groove 120, such that when an optical is deployed within track groove 120, the optical cable is tucked into the track groove and retained in place. Cable retention tabs 320 may be flexible enough for an optical cable to be tucked into track groove 120 during a deployment, and cable retention tabs 320 may be stiff enough to retain a deployed optical cable within track groove 120. Cable retention tabs 320 may be formed from various materials including, for example, metal, plastic, elastomers composites, and the like.

The shape and size of cable retention tabs 320 may also vary based on the size of optical cable that is deployed, the size and orientation of track grooves, and/or other aspects of the deployment operation. For example, in certain implementations, cable retention tabs 320 may be generally oblong, while in other implementations, cable retention tabs 320 may be generally rectangular. Similarly, in certain implementations, cable retention tabs 320 may extend across the entire track groove 120, while in other implementations, cable retention tabs 320 may only extend a portion over track groove 120. In implementations where cable retention tabs 320 do not extend over the entire portion of track groove 120, they may extend 20 percent, 50 percent, 75 percent over track groove 120, as well as other ranges therebetween.

Figure 22:
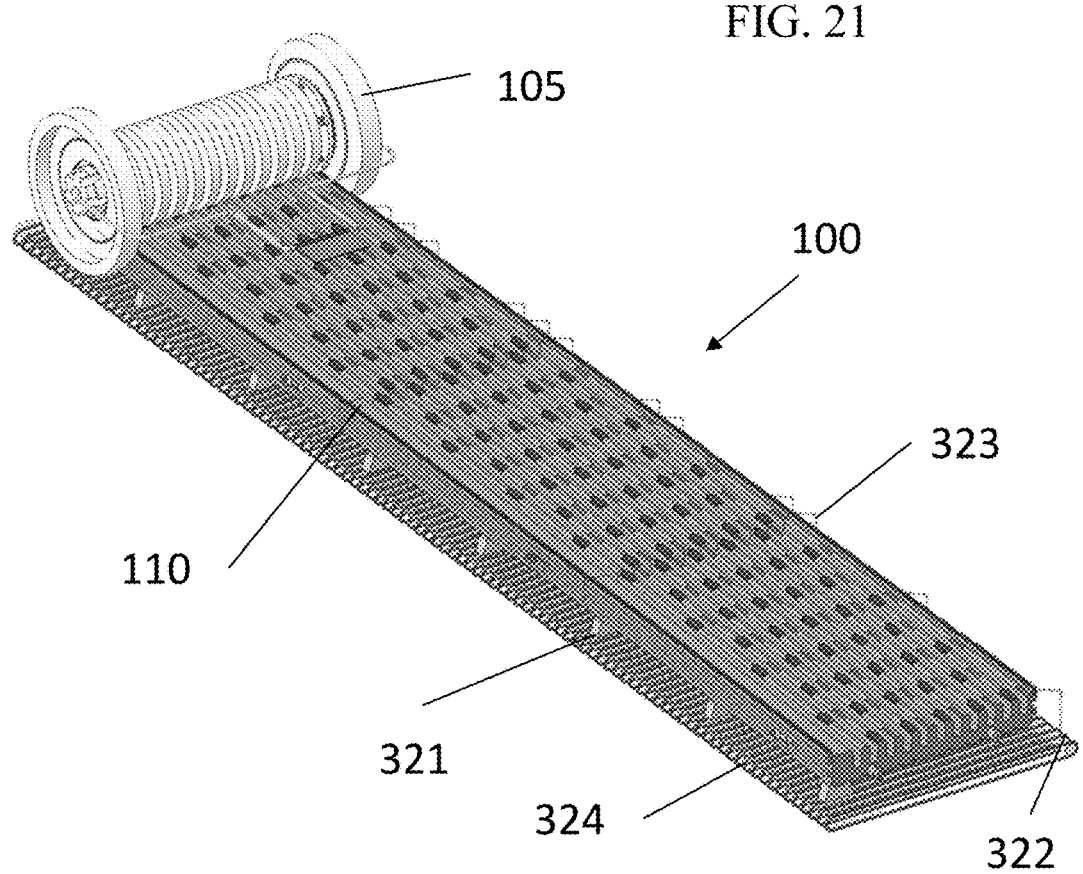
FIG. 22 is a perspective view of a system for deploying optical cables having a track hanger, according to one or more examples of the present disclosure.
Figure 23:
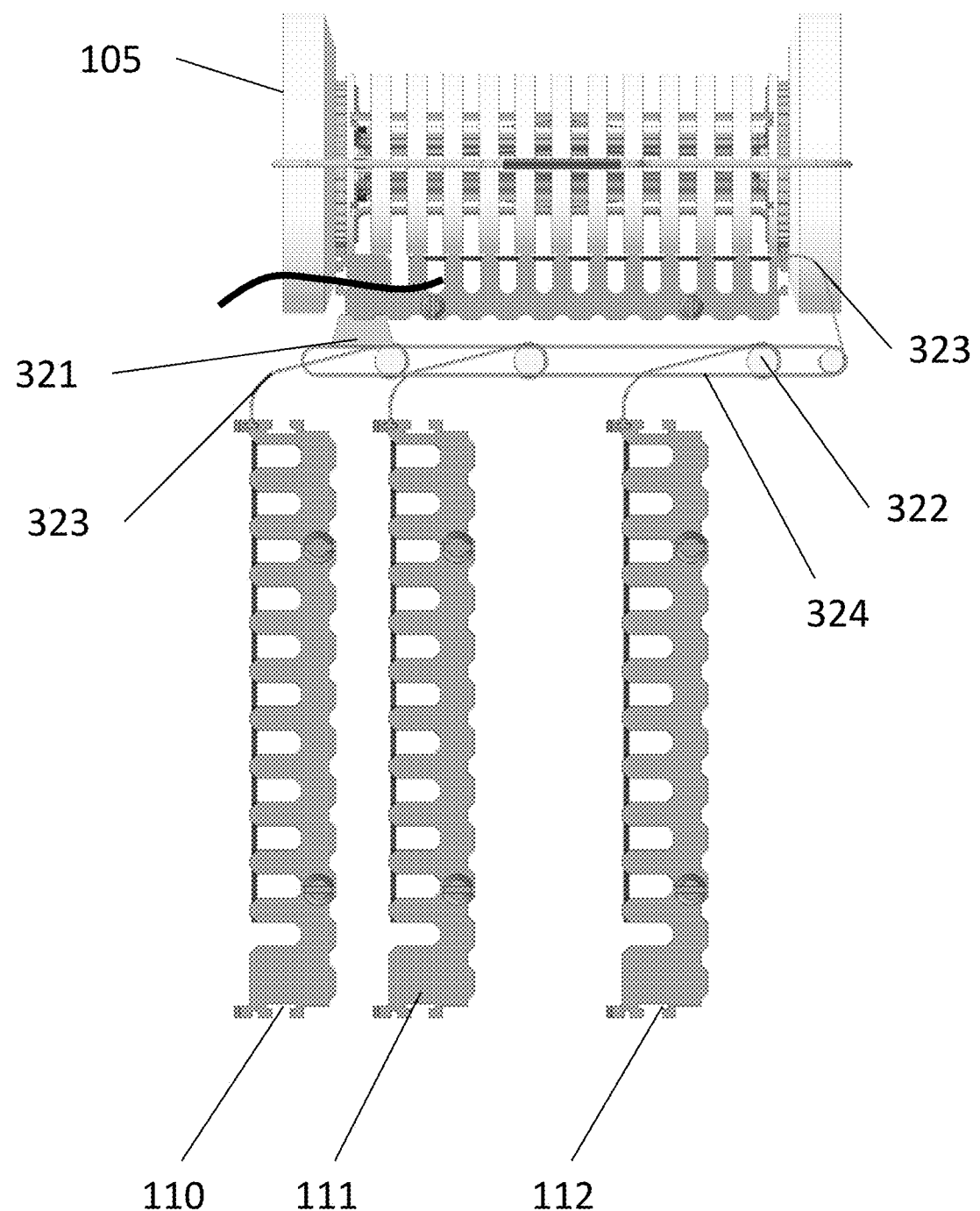
FIG. 23 is a side view of a system for deploying optical cables having a track hanger, according to one or more examples of the present disclosure.

Turning to FIGS. 22 and 23, a perspective view and a side view of a system for deploying optical cables having a track hanger according to the present disclosure are shown. In this implementation, system 100 includes a spool 105 disposed on a track 110, such as spools 105 and tracks 110 discussed above. However, in this aspect, system 100 is configured to allow cables to be hang-stacked, such that track 110 and/or tracks 110 may initially be disposed in a first orientation, such as horizontal, and then moved into a second orientation, such as vertical or angled. For example, track 110 may initially be disposed in a horizontal position. Cables may then be disposed in track, such as in the manner discussed above. After the cables are in position on track 110, track 110 may be moved into a second orientation, such as vertical or angular. Hang-stacked tracks 110 allow multiple optical cables to be deployed modularly, allowing for easier deployment, repair, and/or changes to be made to optical cables.

To allow for a change in orientation, track 110 may be disposed on one or more track stands 321. In this implementation, track 110 may be disposed on track stands 321 that are located on one side of track 110. Track stands 321 may be formed from various materials such as, for example, plastic, metals, metal alloys, composites, and the like. Track stands 321 may be disposed on top of a track curtain rail 324. Track curtain rail 324 may include a substrate formed from similar materials as track stands 321, Track curtain rail 324 may include a substantially hollow cross-section, through which one or more track curtain rods 322 are disposed. Each track 110 may be attached to a track curtain arm 323, which is in turn may be attached to track curtain rod 322. Track curtain rod 322 allows track 110 to be rotated about an edge of track curtain rail 324, thereby allowing track 110 to change orientation, e.g., from horizontal to vertical. Track curtain rods 322 also provide structural support for each track 110 that is attached to corresponding track curtain arm 323.

Individual tracks 110 may be connected to track curtain rail 324 through one or more track curtain arms 323. Track curtain arms 323 may be formed from materials similar to that of track stands 321 and/or track curtain rail 324. Track curtain arms 323 may provide a pivot point that allows tracks 110 to move relative to track curtain rail 324.

Figure 14:
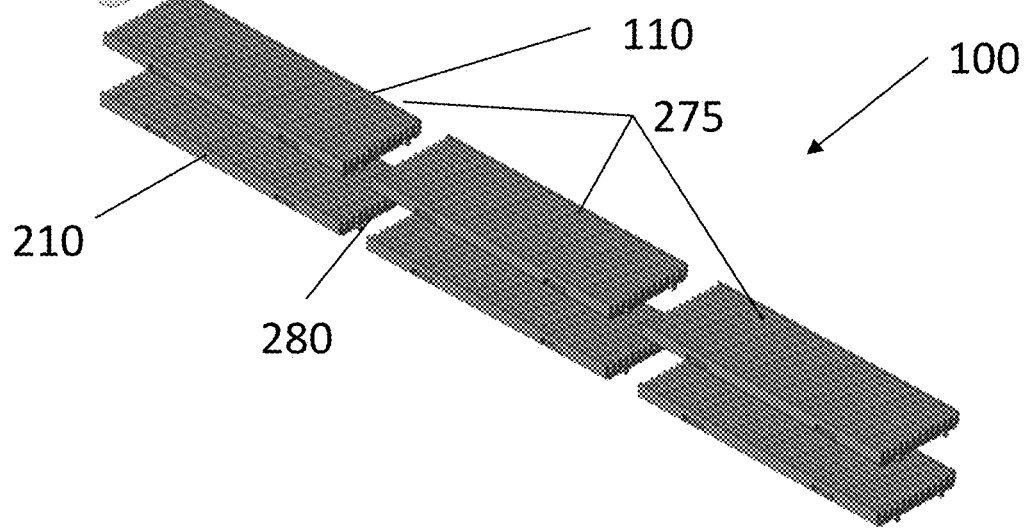
FIG. 14 is a perspective view of an unassembled track, according to one or more examples of the present disclosure.
Figure 15:
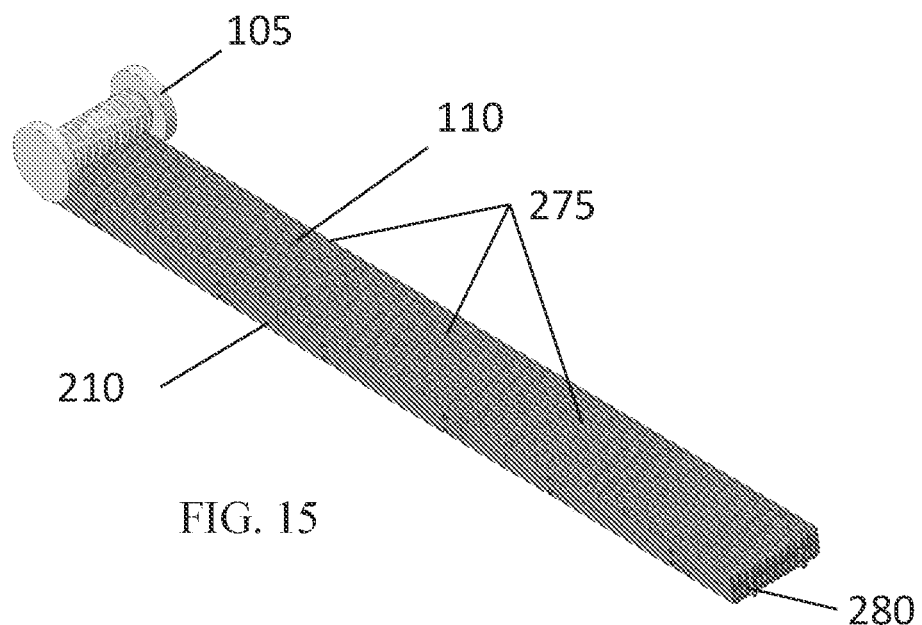
FIG. 15 is a perspective view of a spool on an assembled track, according to one or more examples of the present disclosure.
Figure 16:
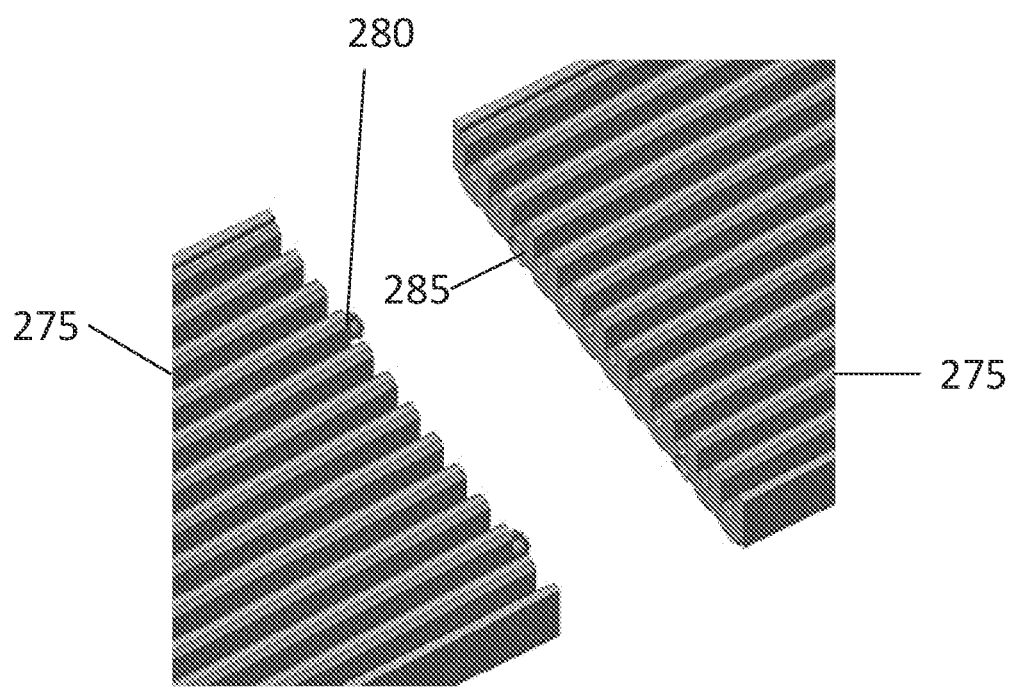
FIG. 16 is a close perspective view of partial track sections, according to one or more examples of the present disclosure.
Figure 17:
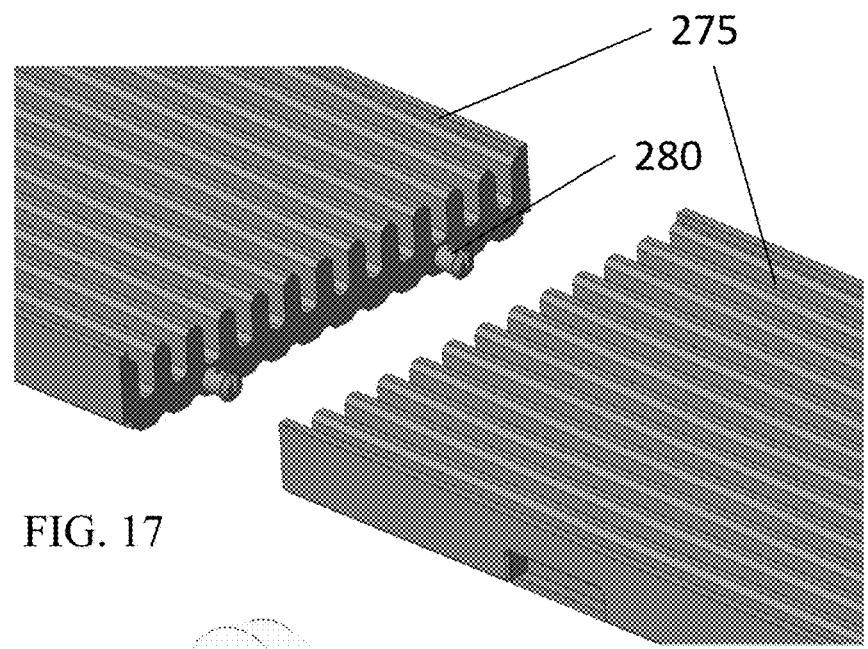
FIG. 17 is a second close perspective view of partial track sections, according to one or more examples of the present disclosure.

During operation, cable may be disposed on or within track 110. After the cable run is complete, spool 105 may be disconnected from track 110, and track 110 may be moved from a horizontal orientation into a second orientation, such as a vertical or angular orientation, as specifically illustrated in FIG. 23. In certain implementation, where multiple tracks 110 are employed, cable may be disposed in a first track 110, spool 105 may be disconnected from first track 110 and a second track 111 may be disposed on top of first track 110 (as illustrated in FIGS. 13-15). Cable may then be disposed in second track 111. This process may then proceed in a similar manner with respect to a third track 112 and/or additional tracks.

When cable has been disposed in tracks 110/111/112, etc., tracks 110/111/112 may be rotated relative to track curtain rail 324 into a second orientation and held in place by track curtain arms 323. As track curtain arms 323 are attached to track curtain rods 322, tracks 110/111/112 may be positioned into an orientation as directed by operational limitations, such as space, equipment orientation, and the like.

In other implementations, cable may be disposed in first track 110, spool 105 may be disconnected from first track 110, and track 110 may be moved from first orientation into a second orientation. After first track 110 is in a second orientation, a second track may be disposed on track stand 321 and connected to a different track curtain arm 322. Cable may then be disposed in second track 111, spool may be disconnected from second track 111, and second track 111 may be moved into a second orientation, similar to that of first track 110. This process may continue for third track 112 and/or additional tracks.

Accordingly, cable may be disposed in all tracks 110/111/112 prior to reorientation, or cable may be disposed in individual tracks 110/111/112, and the individual track 110/111/112 may be independently moved from a first orientation into a second orientation. As such, system 100 may provide a modular approach that allows tracks 110 to be added as operational requirements are modified or otherwise change. For example, computing equipment may be added in a computing environment that uses additional cables. An additional track 110 may be added to the existing infrastructure, thereby allowing new cable to be run without interfering with existing cable. In certain implementations, the first orientation may not be horizontal. For example, first orientation may be vertical or angular, and the second orientation may be horizontal or at a different angular orientation. Similar to aspects described above, cable may also be disposed in track 110 upside down or in various other configurations, as track 110 may be rotated or otherwise moved relative to track curtain rail 324.

Figure 24:
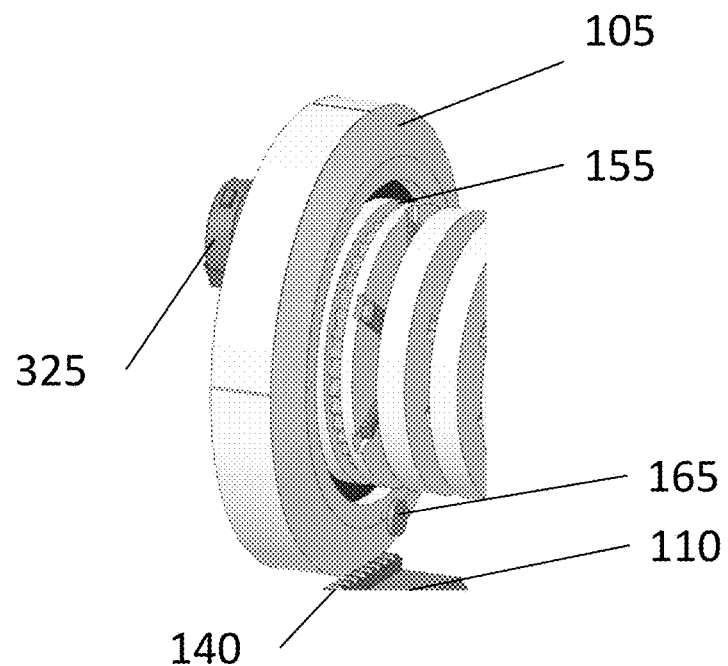
FIG. 24 is a side perspective view of a spool having a motor, according to one or more examples of the present disclosure.
Figure 25:
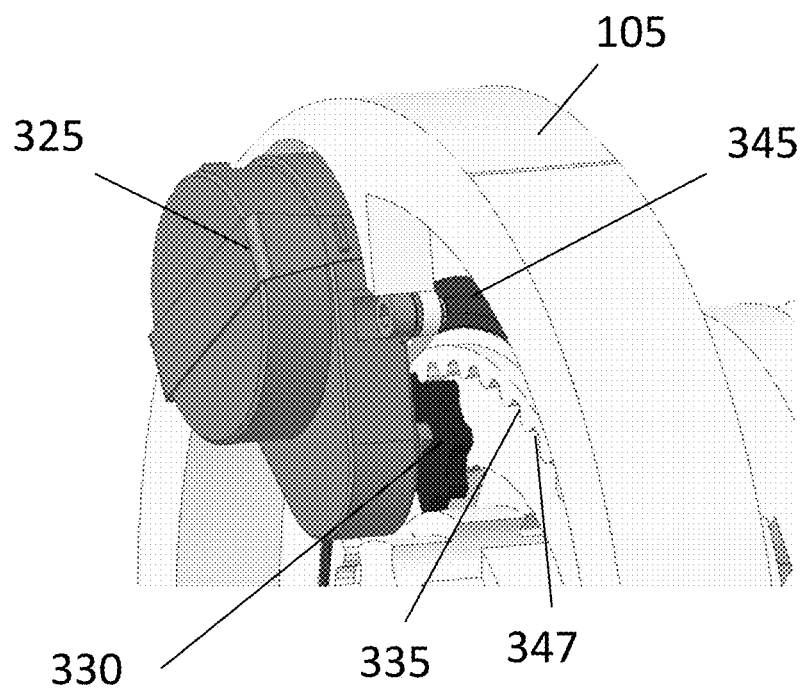
FIG. 25 is a side perspective view of a spool with a motor, according to one or more examples of the present disclosure.
Figure 26:
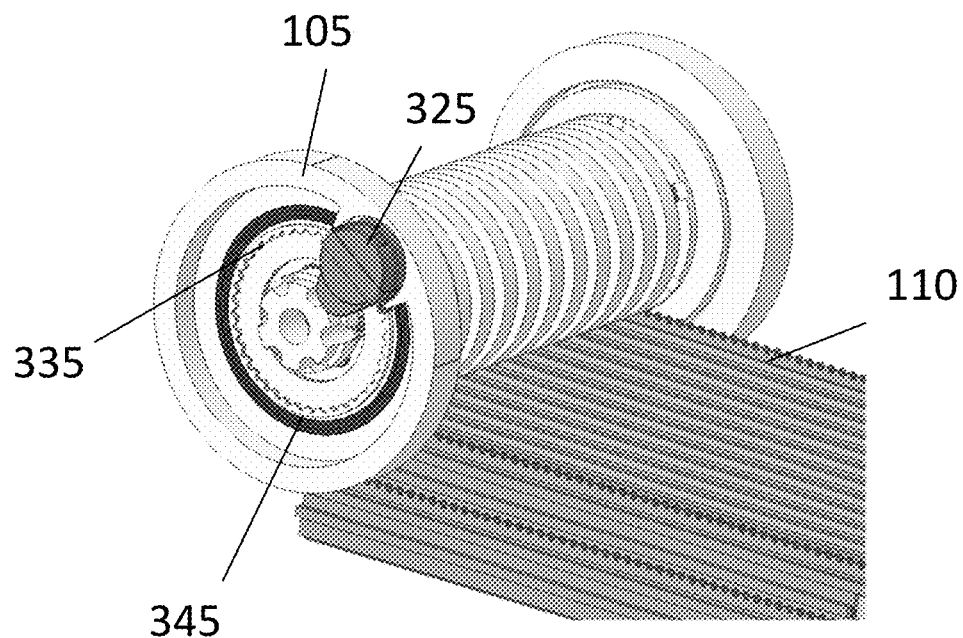
FIG. 26 is a side perspective view of a motorized system for deploying optical cable, according to one or more examples of the present disclosure.

Turning to FIGS. 24, 25, 26, a side perspective view of a spool having a motor, a side perspective view of a spool with a motor, and a side perspective view of a motorized system for deploying optical cable are shown. In this implementation, a spool 105 having a motor 325 attached thereto is illustrated. Motor 325 includes or is otherwise connected to a motor gear 330, which is configured to engage an inner spool 335. In this implementation, motor gear 330 includes a plurality of motor gear teeth 340, which corresponding to a plurality of inner spool teeth 347. In other implementations, the engagement between motor gear 330 and inner spool 335 may occur in various other ways, such as a direct connection therebetween, a unified drive, a magnetic drive, and the like.

Spool 105 also includes a spool bearing 345 disposed radially outward of inner spool 335, thereby allowing spool 105 to rotate during optical cable deployment. During operation, as motor 325 turns motor gear 330, inner spool 335 rotates, thereby advancing spool 105 down track 110. As explained above, spool gear 155 may engage track gear 140 thus allowing spool 105 to advance along track 110 when motor 325 is engaged. Additionally, tracking wheels 165 may ground spool 105 to track 110, thereby preventing spool 105 from becoming disengaged from track 110.

Figure 27:
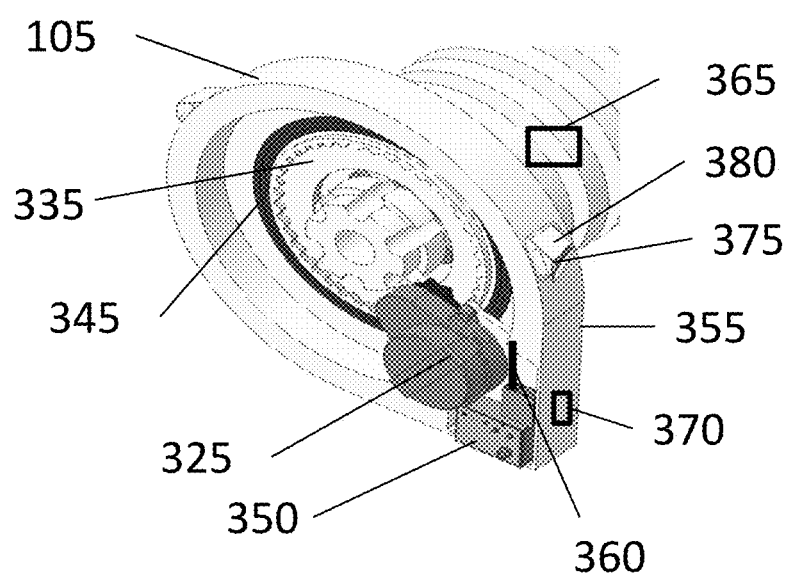
FIG. 27 is a side perspective view of a spool, according to one or more examples of the present disclosure.
Figure 28:
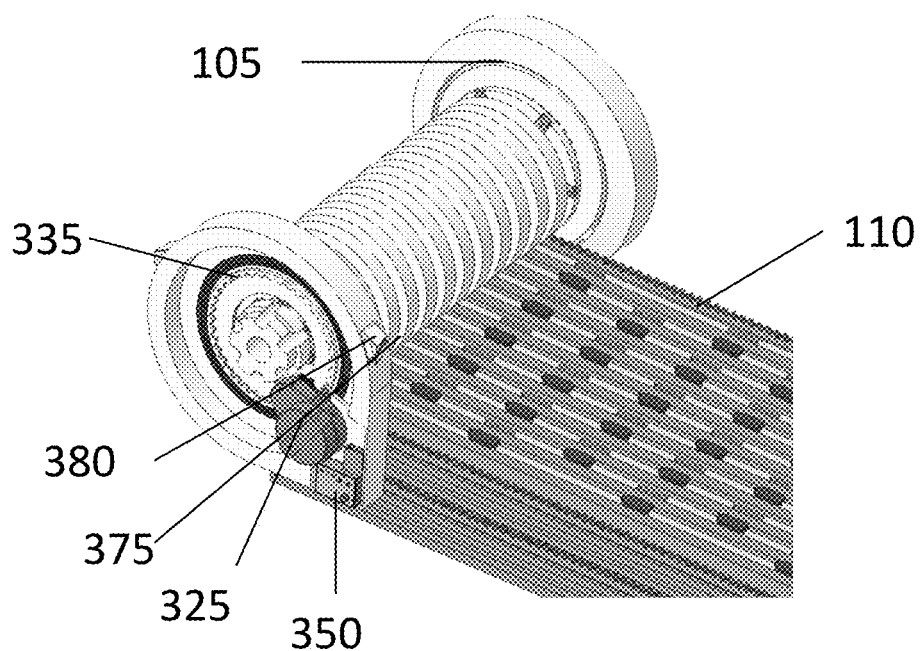
FIG. 28 is a motorized system for deploying optical cable, according to one or more examples of the present disclosure.
Figure 29:
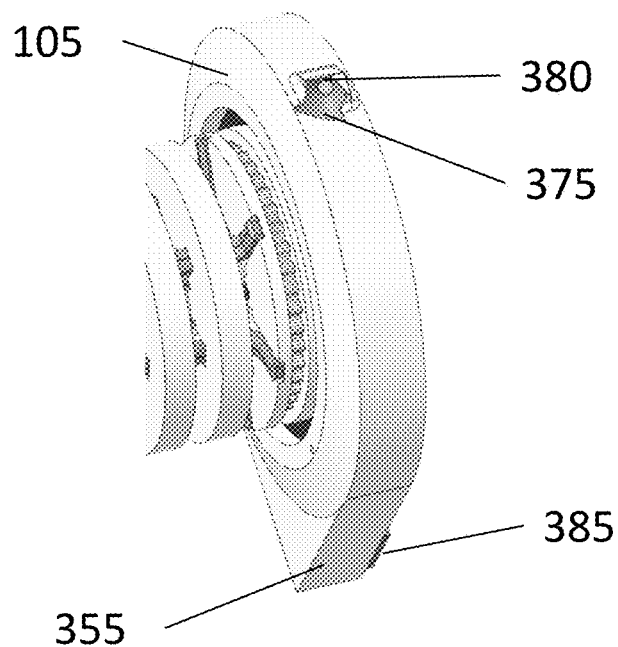
FIG. 29 is a close perspective of a spool, according to one or more examples of the present disclosure.

Turning to FIGS. 27, 28, and 29 a side perspective view of a spool, a motorized system for deploying optical cable, and a close perspective of a spool according to the present disclosure are shown. In this implementation, system 100 incudes a spool 105 having a motor 325 disposed on a track 110. As described above, in such a system 100, motor 325 may include a motor gear 330 that engages an inner spool 335, thereby allowing spool 105 to move relative to track 110. Spool 105 may further include a spool bearing 345 disposed radially outward from inner spool 335.

In this implementation a system controller 350 is disposed on a spool housing 355. System controller 350 may include various functionalities including directional switches to control the movement of motor 325, power button, speed control, and the like. System controller 350 may also include wireless connectivity that allows for remote control of spool 105, and thus system 100. In certain implementations, system controller 350 may be connected to an antenna 360, thereby providing remote access to system 100.

System 100 may also include one or more identification tags 365, such as an identification tag disposed on spool 105 that includes information such as the type of fiber, type of optical cable, configurations, manufacturing information, optical cable diameter, and the like. In certain implementations, system 100 may include assembly identification tags 370, which may be disposed on spool 105 and/or spool housing 355. Such assembly identification tags 370 may include radio frequency tags that include information about spool 105, such as serial number, model number, and the like.

In certain aspects, system 100 may also include one or more lights 375, which may be disposed on spool 105 and/or spool housing 355. Lights 375 may point to a front or rear and/or provide movable orientation so that light may be provided to a certain location before, during, or after cable deployment. System 100 may also include one or more cameras 380 that may be associated with lights 375, thereby allowing remote viewing of cable deployment. In such implementations, system may provide artificial intelligence assisted control for spool 105, thereby allowing cable deployment to be automated or remotely controlled.

System 100 may also include a tag sensor 385, which may be disposed on spool 105 and/or spool housing 355. Tag sensor 385 may include a radio frequency identification sensor that may be used to track or otherwise read radio frequency tags on track 110.

Figure 30:
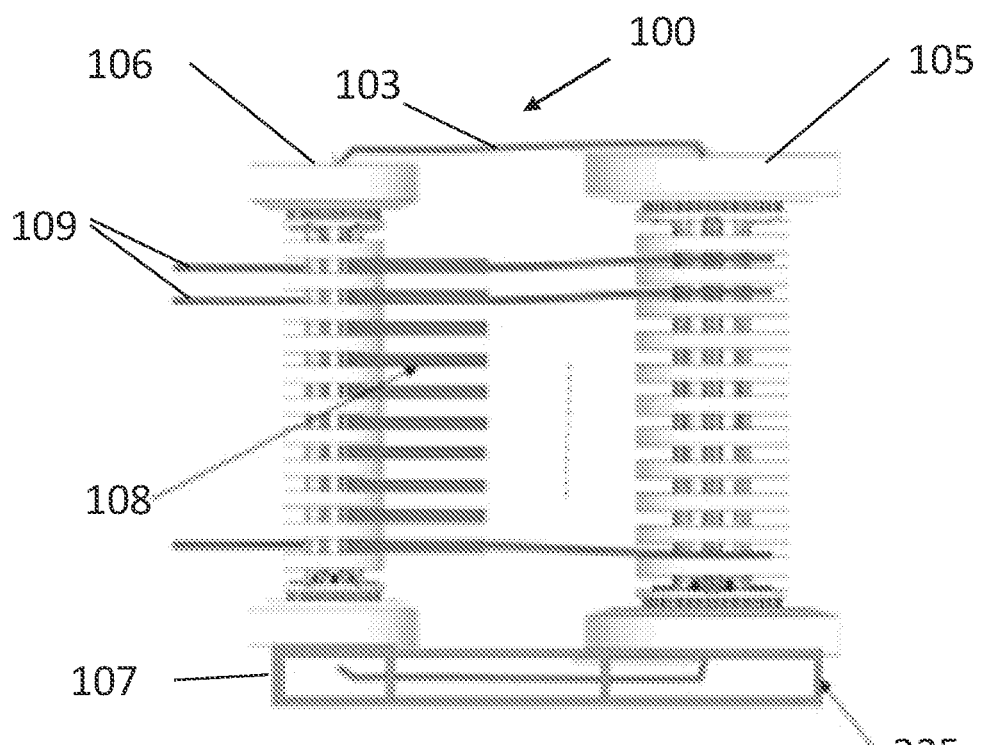
FIG. 30 is a top view of a system for deploying optical cable, according to one or more examples of the present disclosure.
Figure 31:
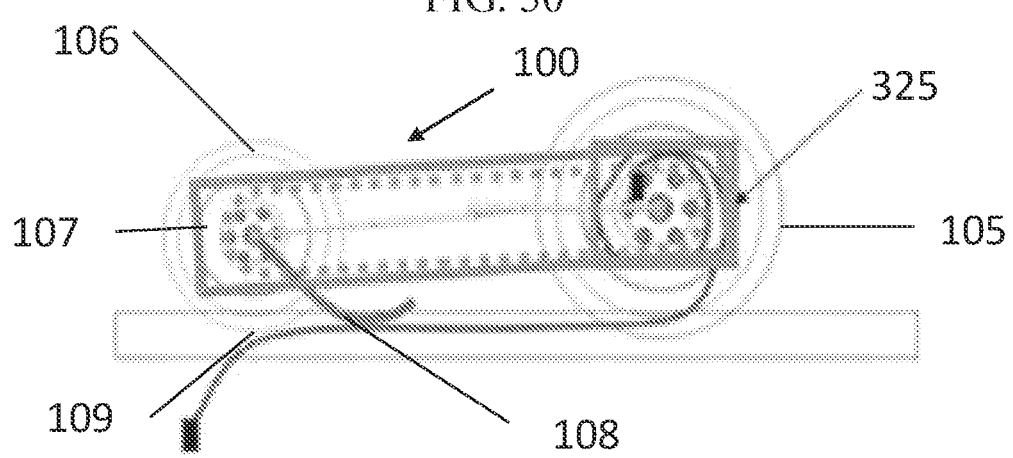
FIG. 31 is a side view of a system for deploying optical cable, according to one or more examples of the present disclosure.

Turning to FIGS. 30 and 31, a top view and a side view of a system for deploying optical cable, according to one or more examples of the present disclosure are shown. In this implementation, system 100 includes a spool 105 that is connected to a spool trailer 106. One or more cables 109 may be wrapped around or otherwise disposed on or in spool 105 such as provided in the description above. Spool 105 and spool trailer 106 may be connected through one or more spool attachments 103, thereby holding spool 105 and spool trailer 106 in alignment with one another.

Spool trailer 106 may have one or more guide arms 108. Guide arms 108 may be in relative alignment with grooves (not shown) on a track (not shown). During operation, as spool 105 and spool trailer 106 are moved on a track, cable 109 may be disposed on the track and guide arms 108 may direct cable 109 into specific grooves within the track. Accordingly, guide arms 108 may push cable 109 under cable retention tabs (not shown), as described in detail above.

In certain implementations, a motor 325, such as those described above, may be attached to spool 105. Motor 325 may be used to roll spool 105 on a track. Because spool 105 is connected to spool trailer 106, spool trailer 106 may also be automatically moved on the track. In certain implementations, spool attachments 103 may be sufficient to move spool trailer 106 with spool 105. However, in other implementations, a motor housing connector 107 may connect motor 325 to spool trailer 106, thereby providing an additional or independent connection between spool 105 and spool trailer 106. Systems 100 having spool trailer 106 may be used along with various aspects discussed above.

Systems 100 having spool trailer 106 may provide for cable deployment in various orientations, as both spool 105 and spool trailer 106 are connected to tracks. Accordingly, cable may be deployed horizontally, vertically, or angularly, such as in the implementations discussed above.

Figure 32:
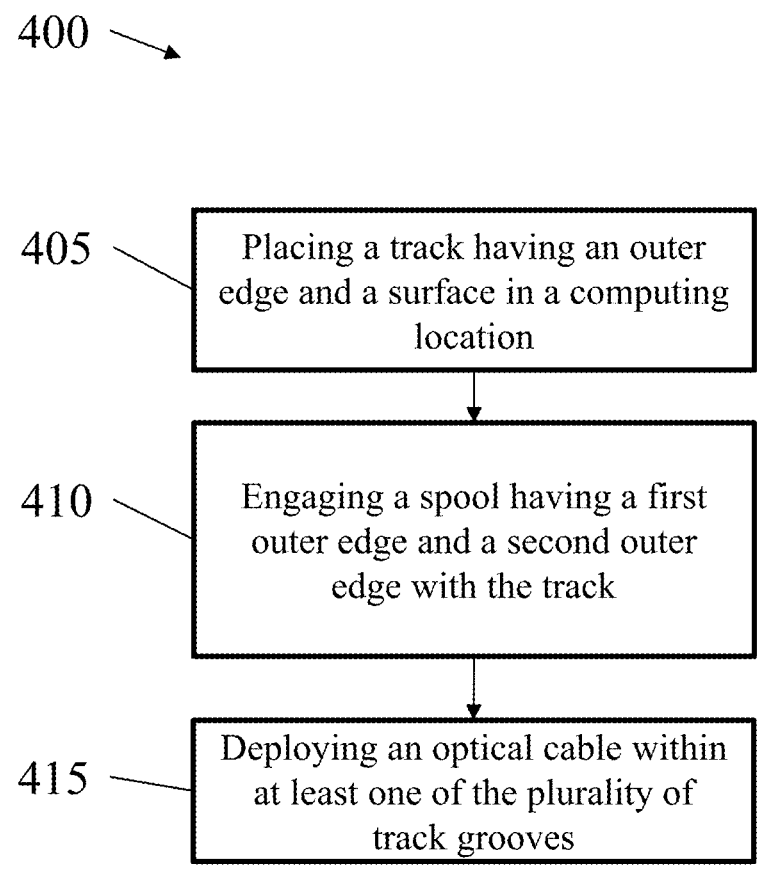
FIG. 32 is a flowchart of a method for deploying optical cables, according to one or more examples of the present disclosure.

Turning to FIG. 32, a flowchart of a method for deploying optical cables according to the present disclosure is shown. In operation, method 400 may include placing (block 405) a track having an outer edge and a surface in a computing location, such as a datacenter, for example. The track may include a track gear disposed proximate an outer edge of the track. The track may also include a plurality of track grooves disposed on a surface of the track.

Method 400 may further include engaging (block 410) a spool having a first outer edge and a second outer edge with the track. The spool may include a first wheel disposed on the first outer edge and a second wheel disposed on the second outer edge. The spool may further include a spool gear disposed on the first wheel that interfaces with the track gear as well as a plurality of spool grooves. Spool may also include a plurality of guides that interface with the track to align the track grooves with the spool grooves. An optical cable may also be disposed within at least one of the plurality of spool grooves.

Method 400 may also include deploying (block 415) the optical cable within at least one of the plurality of track grooves. In certain implementations, the deploying may include moving the spool over the track. Such movement may occur manually, through use of an operator, or in certain implementations, may include moving the spool over the track using a motor.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A system for deploying optical cables, the system comprising:

a track having an outer edge and a surface, the track comprising:
    a track gear disposed proximate the outer edge; and
    a plurality of track grooves disposed on the surface of the track; and
a spool having a first outer edge and a second outer edge, the spool comprising:
    a first wheel disposed on the first outer edge;
    a second wheel disposed on the second outer edge;
    a spool gear disposed on the first wheel and interfacing with the track gear;
    a plurality of spool grooves; and
    a plurality of guides interfacing with the track to align the track grooves with the spool grooves.

2. The system of claim 1, further comprising at least one optical cable disposed around the spool.

3. The system of claim 1, wherein the spool further comprises a spool locking mechanism.

4. The system of claim 1, wherein the spool further comprises at least one guide arm to hold an optical cable within at least one of the plurality of spool grooves.

5. The system of claim 1, wherein the spool has an adjustable inner diameter.

6. The system of claim 1, further comprising a motor attached to the spool to automate deployment of an optical cable disposed on the spool.

7. The system of claim 6, further comprising a spool controller operationally connected to the motor.

8. The system of claim 1, further comprising a tracking wheel disposed in the outer edge of the track and the first wheel.

9. The system of claim 1, further comprising a tag reader disposed on the track.

10. The system of claim 1, wherein the track further comprises at least two track sections that are mechanically connected.

11. The system of claim 1, wherein the system further comprises a spool trailer connected to the spool.

12. The system of claim 1, further comprising a second track disposed proximate the surface of the track.

13. The system of claim 1, further comprising a plurality of cable retention tabs attached to the plurality of track grooves.

14. A system for deploying optical cables, the system comprising:
    a first spool wheel;
    an inner spool comprising a first outer spool gear;
    a bearing disposed on the inner spool and contacting the first spool wheel;
    a second spool wheel, the second spool wheel including a second outer spool gear; and
    a gear motor disposed on the first spool wheel, the gear motor including:
        a motor gear engaged with the inner spool.

15. The system of claim 14, further comprising a spool housing in which the first spool wheel is disposed.

16. The system of claim 14,
    wherein the first spool wheel is rotatably coupled to the inner spool by the bearing;
    wherein the inner spool is coupled to the second spool wheel;
    wherein the first and second outer spool gears are configured to, in a deployed state of the system on a track, engage with respective tracks gears arranged on opposite sides of the track; and
    wherein the gear motor is configured to drive rotation of the inner spool wheel relative to the first spool wheel.

17. The system of claim 15, further comprising at least one of a tag reader, a camera, and a light disposed on the spool housing.

18. A method for deploying optical cables, the method comprising:
    placing a track having an outer edge and a surface in a computing environment, the track comprising:
        a track gear disposed on or proximate the outer edge; and
        a plurality of track grooves disposed on the surface of the track; and
    engaging a spool having a first outer edge and a second outer edge with the track, the spool comprising:
        a first wheel disposed on the first outer edge;
        a second wheel disposed on the second outer edge;
        a spool gear disposed on the first wheel, wherein the spool gear interfaces with the track gear;
        a plurality of spool grooves;
        a plurality of guides that interface with the track to align the track grooves with the spool grooves; and
        an optical cable disposed within at least one of the plurality of spool grooves; and
    deploying the optical cable within at least one of the plurality of track grooves.

19. The method of claim 18, wherein the deploying comprises moving the spool over the track.

20. The method of claim 19, wherein the deploying comprises moving the spool over the track using a motor attached to the first wheel.

* * * * *